United States Patent
Zhang et al.

(10) Patent No.: US 7,272,148 B2
(45) Date of Patent: Sep. 18, 2007

(54) NON-ALG APPROACH FOR APPLICATION LAYER SESSION TRAVERSAL OF IPV6/IPV4 NAT-PT GATEWAY

(75) Inventors: Defu Zhang, Plano, TX (US); Maurice Marks, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1116 days.

(21) Appl. No.: 10/184,294

(22) Filed: Jun. 27, 2002

(65) Prior Publication Data

US 2004/0001509 A1    Jan. 1, 2004

(51) Int. Cl.
    *H04L 12/56* (2006.01)
(52) U.S. Cl. .................... 370/401; 370/466
(58) Field of Classification Search ............. 370/401, 370/466, 467
    See application file for complete search history.

(56) References Cited

U.S. PATENT DOCUMENTS

| | | | |
|---|---|---|---|
| 6,708,219 B1* | 3/2004 | Borella et al. | 709/245 |
| 2003/0110292 A1* | 6/2003 | Takeda et al. | 709/245 |
| 2004/0133692 A1* | 7/2004 | Blanchet et al. | 709/230 |
| 2004/0165602 A1* | 8/2004 | Park et al. | 370/401 |
| 2005/0243828 A1* | 11/2005 | Tsuchiya et al. | 370/392 |
| 2005/0286553 A1* | 12/2005 | Wetterwald et al. | 370/466 |
| 2006/0015647 A1* | 1/2006 | Kang et al. | 709/245 |
| 2006/0098663 A1* | 5/2006 | Shore | 370/401 |
| 2006/0251088 A1* | 11/2006 | Thubert et al. | 370/401 |
| 2006/0259641 A1* | 11/2006 | Kim et al. | 709/245 |

OTHER PUBLICATIONS

Stewart, R. et al., 'SCTP New Transport Protocol for TCP/IP', IEEE Internet Computing, Nov./Dec. 2001, pages 64-69.*
G. Tsirtsis et al., *Network Address Translation-Protocol Translation (NAT-PT)*, Feb. 2000; [online], Retrieved from the Internet:<URL: http://www.ietf.org/rfc/rfc2766.txt?number=2766 (pp. 1-20).
M. Handley et al., *SIP: Session Initiation Protocol*, Mar. 1999; [online], Retrieved from the Internet:<URL: http://www.ietf.org/rfc/rfc2543.txt?number=2543 (pp. 1-143).
K. Egevang et al., *The IP Network Address Translator (NAT)*, May 1994; [online], Retrieved from the Internet:<URL: http://www.ietf.org/rfc/rfc1631.txt?number=1631 (pp. 1-10).
P. Srisuresh et al., *IP Network Address Translator (NAT) Terminology and Considerations*, Aug. 1999; [online], Retrieved from the Internet:<URL: http://www.ietf.org/rfc/rfc2663.txt?number=2663 (pp. 1-29).
Sean Olson et al., *Support for IPv6 in SDP*, Aug. 2002; [online], Retrieved from the Internet:<URL: http://search.ietf.org/internet-drafts/draft-ietf-mmusic-sdp-ipv6-03.txt (pp. 1-5).

(Continued)

*Primary Examiner*—Melvin Marcelo

(57) ABSTRACT

A structure for coupling together addressably disparate nodes, such as IPv4 nodes and IPv6 nodes, without the use of an application level gateway. Instead, the system includes two executable applications, HEART and ECHO, that avoid the necessity of an application level gateway. In general, HEART and ECHO cooperate with each other through a network address translator-protocol translator (NAT-PT) to cause the NAT-PT to temporarily assign an IPv4 address to a control session between the IPv4 and IPv6 nodes and also prevent the control session from timing out due to lack of timely communications between the IPv4 and IPv6 nodes.

11 Claims, 2 Drawing Sheets

OTHER PUBLICATIONS

M. Borella et al., *Realm Specific IP: Protocol Specification*, Oct. 2001; [online], Retrieved from the Internet:<URL: http://www.ietf.org/rfc/rfc3103.txt?number=3103 (pp. 1-51).

P. Srisuresh et al., *Middlebox Communication Architecture and Framework*, Feb. 2002; [online], Retrieved from the Internet:<URL: http://search.ietf.org/internet-drafts/draft-ietf-midcom-framework-07.txt (pp. 1-33).

S. Olson et al., "Support for IPV6 in SDP," Jan. 2002, 4 p.

P. Srisuresh et al., "Middlebox Communication Architecture and Framework," Dec. 17, 2001, 30 p.

J. Rosenberg et al., "SIP Extensions for NAT Traversal," Nov. 21, 2001, 13 p.

J. Rosenberg et al., "Traversal Using Relay NAT (TURN)," Mar. 3, 2003, 39 p.

J. Rosenberg et al., "STUN—Simple Traversal of UDP Through Network Address Translators," Jul. 1, 2002, 38 p.

* cited by examiner

NON-ALG APPROACH FOR APPLICATION LAYER SESSION TRAVERSAL OF IPV6/IPV4 NAT-PT GATEWAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the convergence of addressably disparate IP nodes and networks. More particularly, the present invention relates to coupling together IPv4 and IPv6 nodes without the use of an application level gateway.

2. Background Information

Coupling computers and computer-related equipment together in networks has enabled a variety of capabilities and services that are not possible with standalone machines. Examples of such capabilities and services include file sharing and email. The Internet permits entities which have incompatible addressing schemes to seamlessly and efficiently share information using network address translators.

Computer networks include not just the computers (called "nodes") that communicate with each other, but also an infrastructure that coordinates the transfer of data from one end node to another. The communication infrastructure includes switches, routers and other devices to provide, from the user's viewpoint, a transparent communication mechanism. Each node in the network is assigned an address referred to as an Internet Protocol ("IP") address and each node is accessible via its IP address. Thus, in general, a node wishing to send data to another node needs to know the IP address of the destination node. Armed with the destination IP address, the source node hands the data and the destination address to the communication infrastructure which then routes the data in an appropriate manner to the desired destination node. The data transmission also includes the address of the source node so that the destination node will be able to send messages back to the source node.

Because IP addresses are quite lengthy and hard to remember, end nodes are often assigned an easier to remember alphanumeric name also called a domain name. Domain names are typically in the format of "hostname.companyname.com". An Internet service called Domain Name System ("DNS") converts domain names to their associated IP addresses. This permits a source node to send the domain name of the destination node to the DNS. The DNS looks up the IP address corresponding to the requested domain name and provides the IP address back to the source node. The source node then uses the IP address provided by DNS to establish a communication session with the desired destination node. Typically, application software automatically coordinates the brief communication with DNS to obtain the IP address of the destination in a manner transparent to the user.

The communication infrastructure works remarkably well despite the presence on the network of a wide variety of computers and other types of device owned and operated by a wide variety of disparate organizations. This is true because a variety of standards have been promulgated which specify various aspects of how devices on the network are to communicate with each other. As long as the entities coupled to the network adhere to the accepted standards, the network works fine.

One such standard, which has been used since at least the 1970's is called the Internet Protocol version 4 ("IPv4"). The IPv4 standard provides a great deal of communication specifics, many of which are unnecessary to understand for the purpose of the technology described in this disclosure. One feature of IPv4, however, relevant to this disclosure is its addressing scheme. The IPv4 addresses are 32 bit addresses. An example of an IPv4 address is 132.146.243.30. Although initially, 32 bit addresses provided more than enough unique addresses to accommodate the total number of users, in recent years there has been an explosion in the number of users of IP networks quickly exhausting the addresses provided by IPv4.

For that and other reason, Internet Protocol version 6 ("IPv6") was created. IPv6 is a new version of the IP protocol designed to modernize IPv4. IPv6 has a number of advantages over IPv4 that allows for future Internet growth and will simplify IP configuration and administration. IPv6 specifies 128 bit IP addresses which solves the IP address shortage problem noted above. IPv6 also includes an addressing model that promotes aggressive route aggregation and a power autoconfiguration mechanism. Over time, it is expected that Internet growth will result in widespread adoption of IPv6. Already, IPv6 is becoming more and more widely used and accepted.

There is expected to be a long transition period during which it will be necessary for IPv4 and IPv6 nodes to coexist and communicate with one another. IPv4 nodes are incapable of correctly processing the longer IPv6 IP addresses. Thus, a strong, flexible set of IPv4-to-IPv6 transition and coexistence mechanisms are required during this transition period. One such mechanism is the Network Address Translation-Protocol Translation ("NAT-PT") mechanism. In general, NAT refers to the translation of an IPv4 address into an IPv6 address, and vice versa. The data transmission in an IP network typically include header information and a data payload. The header information include the source IP address, destination IP address, a checksum and other information relevant to the routing of the data payload to the destination node. The checksum is a value that is calculated based on the contents of the rest of the header information. The checksum is used by the destination node to determine whether any errors have occurred in the header during transmission. NAT-PT translates the header in a suitable manner so as to provide a seamless transfer between IPv4 and IPv6 networks.

The following example may help understand this process, although a more detailed explanation can be found in numerous references such as the Network Working Group's "Network Address Translation-Protocol Translation (NAT-PT)" memo dated 2000, incorporated herein by reference, and available on-line at www.ietf.org/rfc/rfc2766.txt?number=2766. By way of example, FIG. 1 shows an IPv6 node 20 capable of communicating with an IPv4 node 26. The IPv6 node 20 has a v6 address of FEDC:BA98:7654:3210::1 and the IPv4 node 26 has a v4 address of 132.146.243.30 NAT-PT node 22 is included to provide the necessary address and protocol translations. The NAT-PT 22 has access to a pool 24 of addresses including all IP addresses from the IPv4 subnet 120.130.26.0/24.

If the IPv6 node 20 wishes to send a session initialization packet to the IPv4 node 26, the NAT-PT 22 locally allocates an address (e.g., 120.130.26.10) from its pool 24 of addresses and the outgoing packet is translated to IPv4. That is, the NAT-PT 22 replaces the source address (FEDC: BA98:7654:3210::1) of the IPv6 node 20 in the outgoing packet with the temporarily assigned v4 address (120.130.26.10) from the pool of v4 addresses. Further, the packet's header checksum is recomputed based on the new IPv4 address. In general, NAT-PT translates the packet header to a suitable IPv4 packet and forwards the packet to the IPv4 node. The translation parameters are cached for the duration of the session and the IPv6-to-IPv4 mapping is retained by NAT-PT 22.

The IPv4 node 26 receives the packet and uses the NAT-PT assigned temporary IPv4 source address (120.130.26.10) as the address for return messages. Any returning traffic towards the IPv6 node 20 will be recognized by NAT-PT 22 as belonging to the same session. NAT-PT 22 will use the state information to translate the packet. NAT-PT replaces the IPv4 address originally provided to the IPv4 node as the source address with the true IPv6 address (FEDC:BA98:7654:3210::1). The translated packet can now be routed inside the IPv6-only stub network as normal.

NAT-PT permits v4 and v6 nodes to communicate with one another regardless of which node initiates the session. The example above depicts the process when the v6 node initiates the session. Although not specifically described herein, the NAT-PT 22 can also temporarily allocate a v4 address to a session when the IPv4 node initiates the session.

Translating the header information for conversion between v4 and v6 nodes and networks is relatively straightforward. Translating the packet's data payloads, however, often is much more complicated and burdensome. Whereas the packet header is formatted according to a standard, the data payloads are application specific. Packet headers are easily translated because the location of the IP addresses and checksums are dictated by the applicable standards. Data payloads are free form and generally can be formatted however the application layer protocol designer desires. An example of when a data payload would need to be translated between IPv6 and IPv4 is for "voice-over-IP" applications. Voice-over-IP generally refers to Internet-based telephony in which users have a "phone" conversation with each other solely via the Internet and not using the standard telephone system. When a call is initiated, the calling node submits a packet to the receiving node that includes the calling node's IP address. This source address is typically included in the packet's header as well as the packet's payload. Not only does the source address in the header need to be translated as described above, but so does the payload's source address. NAT-PT only translates headers, not payloads. A different mechanism is needed to address the payload translation issues.

A currently popular approach is through the use of an Application Level Gateway ("ALG"). An ALG is a separate piece of logic that is specially designed for a particular application protocol. An ALG not only replaces the IPv6 address and IPv4 address in the payload, but also keeps track of some context information associated with the application and NAT-PT. The ALG generally is complicated and consumes computational power. If the application protocol changes to a new version, the ALG must be changed accordingly. Moreover, the continued maintenance and updating of ALGs is very labor intensive and costly. Other approaches to solving the payload translation problem have been discussed and/or are available. Such other approaches include Middlebox Communication Architecture, Application Layer Protocol Extension and Realm Specific IP. These approaches are still early in their development and are not fully tested and working. Accordingly, a better solution is needed than what is currently available today to address the IPv4-IPv6 payload conversion issue described herein.

Another problem to be considered when converting between IPv4 and IPv6 is how to handle applications for which a single control session is insufficient complete. A NAT-PT control session is generally defined as the set of traffic that is managed as a unit for translation by NAT-PT. A control session remains active until affirmatively closed by one of the nodes or upon expiration of a timeout timer. That is, if the nodes do not communicate with each other for a predetermined period of time, the session is automatically ended and the NAT-PT temporarily assigned v4 address is returned to the pool to be recycled for another control session. If, for example, an Internet voice conversation is occurring and the users do not say anything to each other for a period of time, their control session will timeout and end. This termination of temporary IPv4 address assignment is not known to the voice application. The VoIP application will be broken and stopped. The phone conversation can continue only upon reestablishing a new VoIP control session and, in the case of Internet telephony between IPv4 and IPv6 nodes, a new IPv4 address. Terminating and then reestablishing a control session between the two nodes interrupts the phone conversation and is thus undesirable. Further, the new IPv4 address affects the translation process. Moreover, a solution to this problem is also needed.

BRIEF SUMMARY OF THE PREFERRED EMBODIMENTS OF THE INVENTION

The problems noted above are solved in large part by a structure for coupling together addressably disparate nodes, such as IPv4 nodes and IPv6 nodes, without the use of an application level gateway. Instead, in accordance with a preferred embodiment of the invention, the system includes two executable applications, designated as HEART and ECHO in the following description, that avoid the necessity of an application level gateway. In general, HEART and ECHO cooperate with each other through a network address translator-protocol translator (NAT-PT) to cause the NAT-PT to temporarily assign an IPv4 address to a control session between the IPv4 and IPv6 nodes and also prevent the control session from timing out due to lack of timely communications between the IPv4 and IPv6 nodes.

In accordance with the preferred embodiment described below, HEART sends a HEARTBEAT message initially having an IPv6 source address (corresponding to HEART) through the NAT-PT to ECHO. The NAT-PT translates the HEARTBEAT message to replace the IPv6 source address with an IPv4 address selected from a pool of IPv4 addresses. ECHO forms a response message (called an ECHO message) to send back to HEART. The ECHO message includes the NAT-PT temporarily assigned IPv4 address in the payload of the ECHO message. When HEART receives the ECHO message, it extracts the IPv4 address from the payload and thereby is informed as to the IPv4 address assigned by NAT-PT. The IPv4 address is also provided to an application running on an IPv6 node. The application may be any type of application. Without limitation, examples include voice-over-IP applications and video conferencing applications. The application forms IPv6 packets having a payload containing the temporarily assigned IPv4 address. Because the payload is IPv4 compliant from the get-go, no application level gateway is needed.

In addition to causing an IPv4 address to be assigned to a control session and used by an application running on an IPv6 node to form IPv4-compliant payloads, HEART also sends HEARTBEAT messages to ECHO at a periodic rate to prevent the control session from timing out or otherwise expiring. Thus, Internet voice conversation control sessions remain valid even if the users say nothing to each other for a period of time that would otherwise cause the control session to expire.

In this manner, a simpler and more efficient technique is implemented to merge IPv4 and IPv6 nodes and networks together. These and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, manufacturers of network equipment and companies that provide network services may refer to components and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
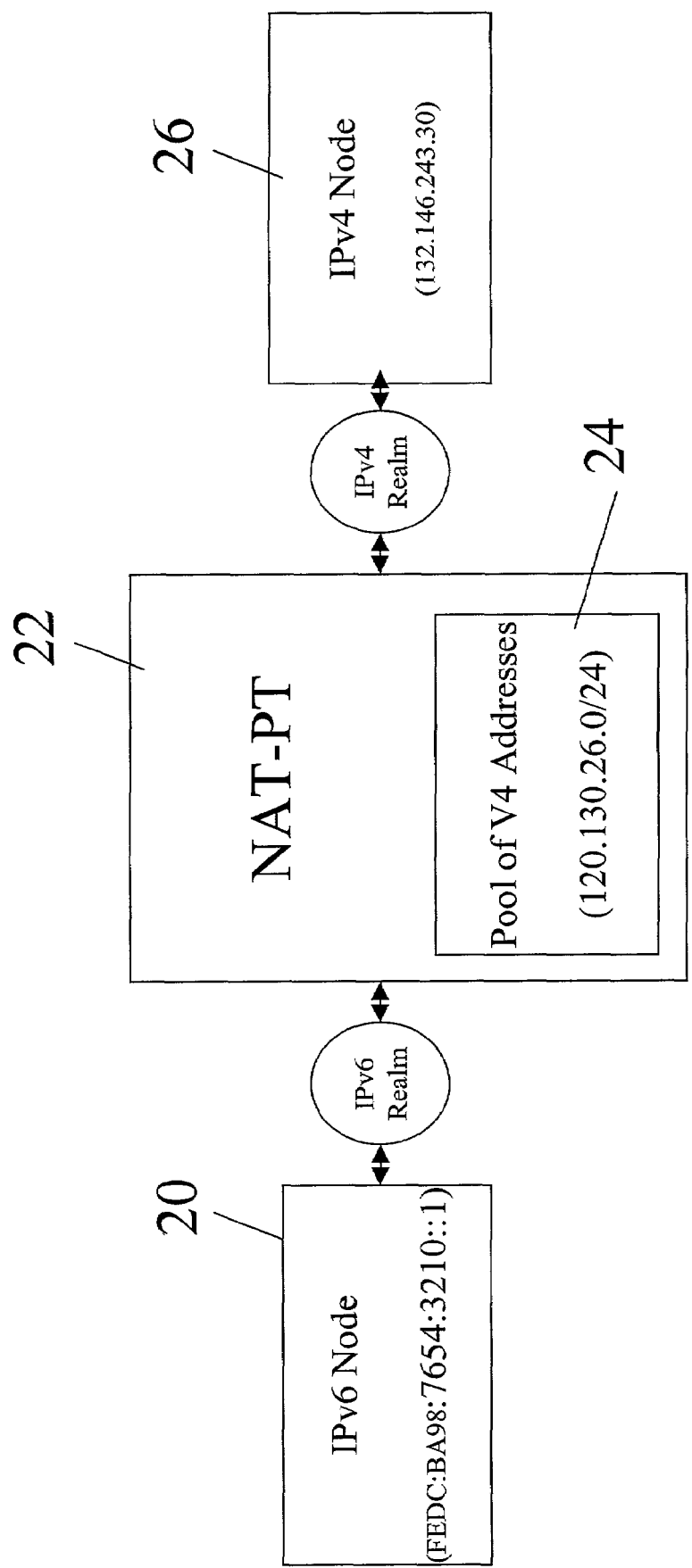
FIG. 1 shows a conventional system in which an IPv4 node is coupled to an IPv6 node.
Figure 2:
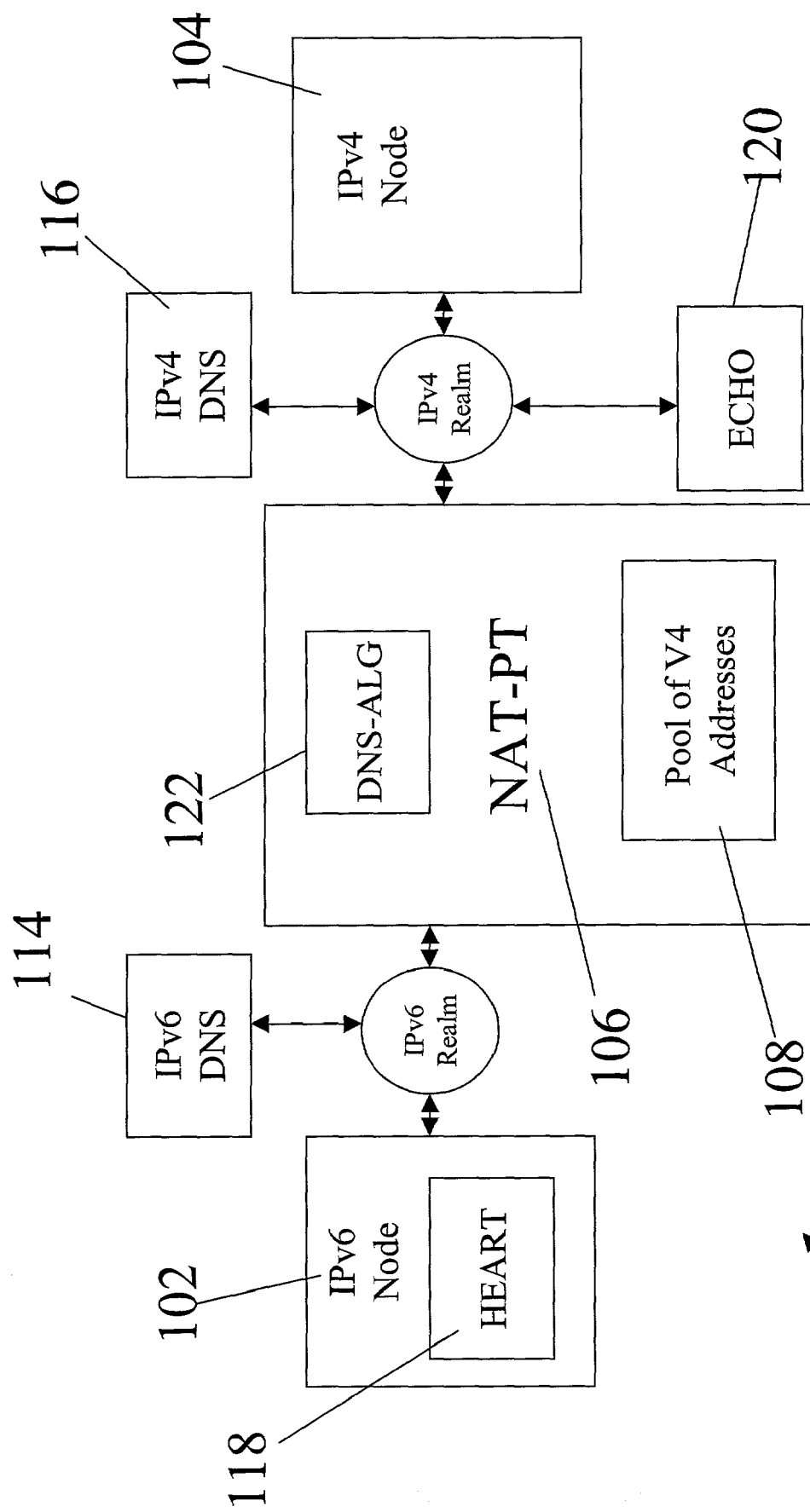
FIG. 2 shows a system in accordance with the preferred embodiment of the invention in which IPv4 and IPv6 nodes are coupled together without the use of an application level gateway.

In accordance with the preferred embodiment of the invention as shown in FIG. 2, system 100 includes at least one IPv6 node 102, at least one IPv4 node 104, NAT-PT 106, a pool 108 of v4 addresses usable by NAT-PT 106, an IPv6 DNS 114, an IPv4 DNS 116, and applications labeled as HEART 118 and ECHO 120, which is running in an IPv4 node and the IPv4 address is well known by IPv6 nodes. Other components may be included as well without departing from the spirit of this disclosure. Although a single IPv6 node 102 and a single IPv4 node 104 are shown, more than one of each type of node can be included. Each node 102, 104 may be a computer having a processor, memory, external interfaces, input/output devices (e.g., displays, keyboards, mouse), and the like.

In general, the IPv6 node 102 and IPv4 node 104 can communicate with each other for any purpose. Either node can initiate a transaction. NAT-PT functions largely as described above to provide the necessary translations of the packet headers. IPv6 nodes are interconnected in IPv6 network realm, and IPv4 nodes are interconnected through IPv4 network realm. The two Internet realms are connected through NAT-PT. The routing mechanisms within realms of IP networks are well defined by relevant Internet protocols.

In accordance with the preferred embodiment, with one exception noted below, an application level gateway ("ALG") is not used to meld IPv4 and IPv6 nodes together. Instead of the IPv6 node forming its data payloads with IPv6 addresses as in conventional systems, the IPv6 node 102 in the preferred embodiment is provided with an IPv4 address from the pool 108 to use in forming its data payloads destined for the IPv4 node. That is, the IPv6 node forms its payloads in a manner that complies from the get-go with IPv4. As such, no translation of payloads is necessary between the IPv6 and IPv4 nodes. Further still, to address the problem whereby a transaction between nodes may span more than one control session, the preferred embodiment of the invention provides a way in which the control session is kept alive and active despite a lack of traffic between applications running on the nodes 102, 104. These features will now be explained in more detail.

Several references will be made to the Session Initiation Protocol ("SIP") which is an application-layer control (signaling) protocol. SIP enables the creation, modification and termination of sessions with one or more participants. SIP is particular useful for sessions that include Internet multimedia conferences, Internet telephone calls and multimedia distribution.

Referring still to FIG. 2, HEART 118 is an executable software component which runs on a processor in an IPv6 node. HEART 118 generally performs two functions. The first function is to initiate a process by which a temporary IPv4 address can be assigned to the node 102/104 session so that the IPv6 node 102 can use the IPv4 address when forming its data payloads. The other function performed by HEART 118 is keep the control session between nodes 102 and 104 active until it is no longer needed. Although a multitude of techniques are possible to implement these functions (and should be considered within the scope of this disclosure), the embodiment described below advantageously uses as much of the existing, well-known infrastructure as possible.

In accordance with normal operation of NAT-PT 106, an IPv4 address from the pool 108 of addresses is not temporarily assigned to a control session until a control session is initiated. That is the first function performed by HEART 10. An IPv6 application running on node 102 may require more than one NAT-PT control session to complete. In cases such as these, the application preferably sends a BIND message to HEART 118 to indicate that a session is about to begin that may need to last longer than one control session. Typical examples of when BIND messages may be sent to HEART include the IPv6 node 102 initiating a multimedia session (e.g., phone call, video conference, etc.) to the IPv4 node or the IPv6 node receiving an SIP INVITE message to start a multimedia session. HEART adds the application sending it the BIND message to a list to keep track of which applications have requested its services.

After HEART 118 receives a BIND message, it begins sending HEARTBEAT messages to ECHO 120, which is a software component running on an IPv4 node. The primary purpose of the first HEARTBEAT message is cause NAT-PT 106 to assign an IPv4 address from pool 108. HEART 118 creates a HEARTBEAT message having a header which includes an IPv6 source address corresponding to HEART and a destination address that is the IPv4 address of ECHO 120 with a prefix IPv6 address that will help to route the packet to NAT-PT. The IPv4 address of ECHO preferably is fixed and known a priori by HEART 118. The payload of the HEARTBEAT message may contain any value that identifies the message as a HEARTBEAT message versus other types of messages. For example, the payload may simply contain the character string 'HEARTBEAT'. Alternatively, because ECHO generally only receives HEARTBEAT messages, the payload of the HEARTBEAT message may be left blank.

The HEARTBEAT message is then provided to NAT-PT 106 which performs its normal translation activity. NAT-PT replaces HEART's IPv6 source address with an IPv4 address selected from pool 108 to be temporarily assigned to the control session. NAT-PT also maintains IPv6-to-IPv4 address mapping information to keep track of which IPv4 address from pool 108 corresponds to which IPv6 address. NAT-PT also replaces the destination address which comprised a concatenated HEART IPv6 address and ECHO's IPv4 address with only the ECHO IPv4 address. Thus, the HEARTBEAT message which is passed from NAT-PT to ECHO 120 is a pure IPv4 message. At this point, HEART 118 has cause NAT-PT to assign an IPv4 address to the transaction, but HEART has not been provided the address. ECHO's function, in part, is to provide HEART the NAT-PT assigned IPv4 address, as explained below.

ECHO 120 receives the pure IPv4 HEARTBEAT message and swaps the source and destination addresses around to thereby create a return ECHO message. That is, the source address of the ECHO message is ECHO 120's IPv4 address and the destination address is the NAT-PT assigned IPv4 address from pool 108. ECHO 120 preferably forms the payload of the ECHO message to include the NAT-PT assigned IPv4 address from pool 108, which, as noted above, at this time is still unknown by HEART and the IPv6 application. ECHO 120 then transmits the ECHO message back to HEART through NAT-PT 106.

NAT-PT 106 receives the ECHO message and translates it. Specifically, NAT-PT uses its IPv6-to-IPv4 mapping information to replace the NAT-PT temporarily assigned IPv4 destination address in the header of the ECHO message with the IPv6 address of HEART. NAT-PT also replaces the header's source address with the destination address HEART originally used to form the HEARTBEAT message (i.e., the HEARTBEAT IPv6 address as a prefix to ECHO's IPv4 address). This translation process creates a pure IPv6 packet. The translated ECHO message still contains the same data payload containing the NAT-PT assigned IPv4 address.

HEART 118 receives the translated ECHO message and extracts the IPv4 address from the payload. At this point, HEART now knows the IPv4 address that NAT-PT temporarily assigned to the control session between nodes 102 and 104. HEART also provides the IPv4 address to the IPv6 application running on node 102. That IPv6 application uses the IPv4 address when generating its data payload. The payloads are thus IPv4-compliant and do not require an application level gateway ("ALG").

HEART 118 continues to send periodic HEARTBEAT messages to ECHO 120 to keep the control session active and the NAT-PT assigned IPv4 address usable in the current control session. Essentially, HEART prevents the control session from timing out due to lack of traffic between nodes 102 and 106. The time interval between HEARTBEAT messages thus preferably is set to a value that is less than the expiration time of the control session. By sending periodic HEARTBEAT messages at a fast enough rate, the control session between nodes 102 and 104 is not permitted to expire due to lack of traffic between the primary application be it a voice-over-IP application, video conferencing application, etc. ECHO responds with an ECHO message for each HEARTBEAT message to let HEART 118 know that ECHO is still alive and operational.

Once the application has completed its job (e.g., the phone call has ended, the IPv6 application preferably sends an UNBIND message to HEART 118 which deletes the application from its list and ceases sending HEARTBEAT messages to ECHO 120. Once the control session naturally times out, NAT-PT returns the temporarily assigned IPv4 address back to pool 108.

As noted above, the system 100 may include one special type of ALG—a domain name system ("DNS")-ALG. DNS is an on-line service that maintains a mapping between IP addresses and domain names (i.e., URLs). As is shown in FIG. 2, system 100 includes an IPv6 DNS 114 and an IPv4 DNS 116. The use of these DNSs is well known, but will be briefly described for sake of completeness.

A session may be initiated by a node in the IPv6 realm or a node in the IPv4 realm. Further, the session initiating node may not know the IP address of the other node. Thus, DNS services are needed to provide the desired IP addresses to the relevant nodes. Because a node in the IPv4 realm may need to know the IP address of the corresponding node in the IPv6 realm, and vice versa, a DNS-ALG 122 is included integrated with NAT-PT 106. IPv6 DNS 114 provides domain name-to-IP address conversions for IPv6 node addresses. Similarly, IPv4 DNS 116 provides domain name-to-IP address conversions for IPv4 node addresses. The DNS-ALG 122 receives domain name look ups attempting to cross between IPv4 and IPv6 realms and functions to correctly translate the look up requests and responses as should be well known by those of ordinary skill in the art. Each IPv6 and IPv4 node thus has a globally unique domain name, and it is an IP address which may be an IPv6 address, a temporary IPv4 address, or a permanent IPv4 address depending what realm the node is located and what node is querying the DNS. A more complete explanation can be found in "Network Address Translation-Protocol Translation (NAT-PT)" by the Network Working Group, G. Tsirtsis and P. Srisuresh, February 2000, incorporated herein by reference.

The preferred embodiments described above advantageously permit IPv4 networks to be merged with IPv6 networks in such a way that avoids the use of application level gateways. DNS-ALG is an application level gateway, but it is included in bi-directional NAT-PT according to the relevant standard. It is an integrated part of bi-directional NAT-PT. The preferred embodiment of the invention is based upon bi-directional NAT-PT. Further still, the problem of a multimedia sessions that would have undesirably timed out in ALG-based implementations has been addressed by providing a mechanism (HEART-ECHO) to maintain the session operational until the applications no longer need the session.

The above discussion is meant to be illustrative of the principles and various embodiments of the present invention. Numerous variations and modifications will become apparent to those skilled in the art once the above disclosure is fully appreciated. Components can be added or removed from the circuits and different circuits altogether that provides the same benefits and functionality can be used. The same concepts can be used in IPv4 NAT with both sides are different IPv4 realms. It is intended that the following claims be interpreted to embrace all such variations and modifications.

What is claimed is:

1. A method of coupling together an IPv4 node and an IPv6 node, comprising:
   (a) selecting a temporary IPv4 address from a pool of IPv4 addresses;
   (b) forming an IPv6 data packet having a header and a payload, wherein the payload includes the temporary IPv4 address; and
   (c) transmitting the data packet from the IPv6 node to the IPv4 node.

2. The method of claim 1 further including:
   forming a heartbeat message to be sent through a network address translator wherein said heartbeat message includes a header that has as an IPv6 source address;
   replacing said IPv6 source address with the temporary IPv4 address; and
   sending said heartbeat message with newly replaced temporary IPv4 source address to an IPv4 node.

3. The method of claim 2 further including forming a heartbeat response message having a header and a payload, said payload including the temporary IPv4 address and sending said response message back through the network address translator.

4. The method of claim 3 further including extracting said temporary IPv4 address from the payload of said response message.

5. The method of claim 1 further including sending periodic heartbeat messages to prevent a control session, in which the IPv4 node and IPv6 node communicate with each other, from timing out.

6. A method of coupling together an IPv4 node and an IPv6 node, comprising:
   (a) forming a heartbeat message;
   (b) sending said heartbeat message through a network address translator;
   (c) forming a heartbeat response message;
   (d) sending said response message back through the network address translator;
   (e) repeating (a) through (d) at a periodic rate to prevent a control session, in which the IPv4 node and IPv6 node communicate with each other, from timing out; and
   (f) providing said IPv6 node with the temporary IPv4 address as a result of a heartbeat message, said IPv6 node includes temporary IPv4 address in its payload.

7. The method of claim 6 wherein said heartbeat message includes, as a source IP address, an IPv6 address and (b) includes translating said IPv6 address to a temporary IPv4 address.

8. The method of claim 7 further including translating IPv6 packets from said IPv6 node to send to said IPv4 node by replacing an IPv6 source address in said packets with said temporary IPv4 address.

9. A system that permits communications between an IPv6 node and an IPv4 node without the use of an application level gateway, comprising:
   an executable heartbeat application running on a processor;
   an executable echo application running on a processor;
   a network address translator coupled to said heartbeat and echo applications;
   wherein said heartbeat application sends a heartbeat message through said network address translator to said echo application to cause said network address translator to temporarily assign an IPv4 address to a control session between said IPv4 and IPv6 nodes wherein said echo application receives said heartbeat message and sends an echo message back to said heartbeat application, said echo message containing a data payload including the temporarily assigned IPv4 address.

10. The system of claim 9 wherein said heartbeat application provides said temporary IPv4 address to said IPv6 node for inclusion in data payloads of messages provided by said IPv6 node to said IPv4 node.

11. The system of claim 9 wherein said heartbeat application sends heartbeat messages at a periodic rate to said echo application to prevent said control session from expiring.

* * * * *